United States Patent Office 3,544,643
Patented Dec. 1, 1970

3,544,643
PROCESS FOR THE CATALYTIC CYCLO-DIMERIZATION OF 1,3-DIOLEFINS
Herbert Schott, Hofheim, Taunus, Germany, assignor to Farbwerke Hoechst Aktiengesellschaft vormals Meister Lucius & Bruning, Frankfurt am Main, Germany
No Drawing. Filed Jan. 14, 1969, Ser. No. 791,175
Claims priority, application Germany, Jan. 27, 1968, 1,668,084
Int. Cl. C07c *13/26, 13/16, 3/10*
U.S. Cl. 260—666    12 Claims

ABSTRACT OF THE DISCLOSURE

Process for the cyclo-dimerization of 1,3-diolefins at a temperature in the range of from 0 to 200° C. using a catalyst prepared by heating at a temperature of from 100 to 400° C. nickel-II compounds, phosphorus-III compounds and metal amides in the presence of the 1,3-diolefin to be dimerized.

---

The present invention relates to a process for the catalytic cyclo-dimerization of 1,3-diolefins with a catalyst system consisting of nickel compounds, phosphorus compounds and metal amides.

Various processes have been proposed for the manufacture of cyclic dimers from 1,3-diolefins. The thermal, non-catalytic dimerization of butadiene-1,3 yields, for example, small amounts of cyclooctadiene-1,5 in addition to large amounts of 4-vinylcyclohexene-1.

According to the process claimed in German Patent 951,213 nickel compounds of the general formula

are used as catalysts in the reaction of butadiene-1,3 to 4-vinylcyclohexene-1 and cyclooctadiene-1,5. It has also been proposed to prepare catalysts for tht cyclo-dimerization of 1,3-diolefins by reducing Ni-II salts in the presence of phosphorus compounds. As reducing agents there are used according to the process of German Pat. 1,140,569 organometal compounds and metal hydrides, preferably of metals of main Groups I to III of the Periodic Table, and according to German Pat. 1,126,864 metals are used, especially those of main Groups I to III of the Periodic Table.

It is known from German Pat. 1,224,770 that Ni-II compounds containing a reducing anion, for example formate, yield on heating in the presence of organo-phosphorus compounds catalysts which transform butadiene-1,3 partially into cyclooctadiene-1,5.

In the known processes for the manufacture of cyclic dimers of 1,3-diolefins either substances that are difficult to handle, for example self-inflammable compounds, must be used or the yields of cyclic dimers of the 1,3-diolefins are unsatisfactory. The low yields, for example with the use of butadiene-1,3, are caused by the formation of large amounts of by-products. Undesired byproducts are, for example, volatile butadiene oligomers, such as 4-vinyl-cyclohexene-1, or non volatile linear butadiene oligomers or polymers which considerably interfere with the working up of the reaction products.

The present invention provides a process for the cyclo-dimerization of 1,3-diolefins at a temperature in the range of from 0 to 200° C. in the presence of a catalyst system comprising nickel and phosphorus compounds which comprises using catalysts obtained by reacting at a temperature in the range of from 100 to 400° C. in the presence of the 1,3-diolefin to be dimerized:

(a) a nickel-II compound
(b) a phosphorus-III compound of the general formula $PR_3$, $P(OR)_3$ or $P(NR_2)_3$ in which R stands for an alkyl or aryl group and
(c) an alkali metal or alkaline earth metal amide.

By the process of the invention butadiene-1,3 can be transformed, for example, into cyclooctadiene-1,5 in a high yield and with high selectivity.

A particular advantage of the process of the invention resides in the fact that for the preparation of the catalyst no self-inflammable compounds must be used but compounds that are easy to handle without danger and readily accessible.

Suitable starting products in the process of the invention are 1,3-diolefins such as butadiene-1,3 or the alkyl-substitution products thereof (the alkyl groups containing 1 to 4 carbon atoms) which are used either alone or in admixture with other other substances which are inert under the reaction conditions.

For the preparation of the catalyst there are preferably used anhydrous nickel-II compounds, such as salts of inorganic or organic acids and chelate complex compounds of bivalent nickel. The following compounds are mentioned by way of example: nickel-II chloride, nickel-II bromide, nickel-II iodide, nickel-II sulfate, nickel-II nitrate, nickel-II formate, nickel-II acetate, nickel-II propionate, nickel-II butyrate, nickel acetylacetonate, as well as nickel diacetyldioxime, nickel bis-benzyl-dioxime and nickel oxinate. Water-containing nickel-II compounds may also be used, but in this case the water must be removed, for example by adding an excess of alkali metal or alkalin earth metal amide.

By adding phosphorus-III compounds the selectivity of the catalyst is considerably improved. There can be used all compounds of trivalent phosphorus containing organic radicals which may be linked to the phosphorus also via an oxygen or nitrogen atom. Examples of suitable phosphorus compounds are:

triethyl-phosphine,
tri-n-propyl-phosphine,
tri-i-propyl-phosphine,
tributyl-phosphine,
tricyclohexyl-phosphine,
triphenyl-phosphine,
tri-(o-phenylphenyl)-phosphine,
tri-(o-methoxyphenyl)-phosphine,
tri-(o-tolyl)-phosphine,
tri-(p-tolyl)-phosphine,
tri-(α-naphthyl)-phosphine,
triethyl-phosphite,
tri-(n-propyl)-phosphite,
tri-(i-propyl)-phosphite,
tri-(n-butyl)-phosphite,
tri-(i-butyl)-phosphite,
tri-(cyclohexyl)-phosphite,
tri-(o-phenylphenyl)-phosphite,
tri-(o-methoxylphenyl)-phosphite,
tri-(o-tolyl)-phosphite,
tri-(p-tolyl)-phosphite,
tri-(α-naphthyl)-phosphite,
tri-phenyl-phosphite, and
phosphorous acid tripiperidide.

Still further complex compounds simultaneously containing a nickel-II compound and a phosphorus-III compound may be used for preparing the catalyst, for example

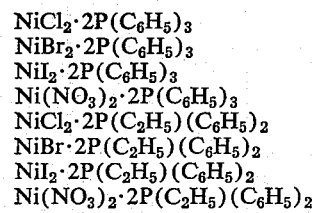

The addition of amides of the elements of Groups Ia and IIa of the Periodic Table is of decisive importance in the manufacture of the catalyst system to be used according to the invention. Suitable compounds are, for example, lithium amide, sodium amide, potassium amide, calcium amide, and magnesium amide. Owing to its being readily accessible sodium amide is especially advantageous. It is preferably used in the form of a suspension in mineral oil fractions boiling at a temperature in the range of from 40 to 260° C., inert hydrocarbons and others.

In order to suppress the formation of undesired polymers of the 1,3-diolefins which may be caused by the presence of radical forming agents, the process of the invention can be carried out in the presence of polymerization inhibitors such as phenols or amines.

The nickel-II compounds and phosphorus-III compounds are preferably used in a molar ratio of from 1:0.5 to 1:10, the best results being obtained with a ratio of 1:1. The ratio of nickel-II compound to alkali metal or alkaline earth metal amide is in the range from 1:0.5 to 1:10.

During the dimerization reaction the catalyst is present in an amount corresponding to 0.1 to 10 millimoles of nickel compound for 100 grams of 1,3-diolefin. Especially good results are obtained with an amount of catalyst corresponding to 1 to 5 millimoles of nickel compound for 100 grams of diolefin.

To prepare the catalyst system to be used in the process of the invention the combined catalyst components are reacted for one minute to 2 hours at a temperature in the range of from at least 100° C. to at most 400° C. in the presence of 1,3-diolefins and, if desired, an inert solvent. If desired a longer heating time may be used. As soon as the dimerization has started, it can be continued at a temperature in the range of from 0 to 200° C.

The dimerization is suitably started under a pressure which depends on the temperature and the vapor pressure of the 1,3-diolefin and the solvent possibly added. The reaction of the 1,3-diolefin can then be continued at atmospheric pressure or under a pressure in the range of from 1 to 150 atmospheres gauge.

Suitable solvents that may be added are, for example, aliphatic, cycloaliphatic or aromatic hydrocarbons and ethers.

The process of the invention can be carried out discontinuously by introducing the catalyst components into an autoclave, then forcing in the 1,3-diolefin and heating the autoclave to the desired temperature. When the reaction is terminated, the reaction products are discharged.

Alternatively, the catalyst components can be suspended in the autoclave in a solvent or dispersion medium, the diolefin can be forced in and the autoclave heated to the desired reaction temperature. When the reaction is terminated, the reaction products are discharged.

The process of the invention may also be carried out in continuous manner by continuously removing the dimer formed in the reaction from the reactor and simultaneously forcing in fresh amounts of catalyst and 1,3-diolefin. The continuous reaction may be carried out in a heated pressure tube at one end of which the reactants are introduced, whilst the reaction products are withdrawn at the other end.

The cyclo-dimerization products of the invention can be used as starting materials for the manufacturing of dicarboxylic acids of medium chain length. They can also be used as starting material for the production of Nylon 8.

The following examples serve to illustrate the invention but they are not intended to limit it thereto.

EXAMPLE 1

1 gram of nickel-II acetylacetonate, 2 grams of tri-(o-phenylphenyl)-phosphite and 0.8 gram of a 50% benzenic sodium amide suspension were suspended in 8 grams of benzene and the suspension was transferred into an autoclave. After forcing in 52 grams of butadiene-1,3, the autoclave was heated for 2 hours at 140°, whereupon a pressure of about 17 atmospheres adjusted. The reaction products were worked up by distillation. 46 grams of volatile butadiene oligomers were obtained while in the distillation residue there remained behind only 1.3 grams of nonvolatile butadiene oligomers besides the catalyst. The volatile butadiene oligomers contained 3.2 grams of 4 - vinylcyclohexene-1, 40 grams of cis-cis-cyclooctadiene-1,5 and 0.9 grams of cyclododecatriene-1,5,9.

EXAMPLE 2

3.5 grams of dichloro-bis-triphenyl-phosphine-nickel-II complex compound and 0.6 gram of lithium amide were suspended in 8 grams of benzene and the suspension was transferred into an autoclave. After forcing in 47 grams of butadiene-1,3, the autoclave was shaken for 10 hours at 140° C. A pressure of about 17 atmospheres gauge adjusted. On working up the reaction products, 40 grams of volatile butadiene-1,3-oligomers were obtained containing 11.4 grams of 4 - vinyl-cyclo-hexene-1, 22.7 grams of cis-cis-cyclooctadiene-1,5 and 4.2 grams of cyclododecatriene-1,5,9. Besides the catalyst no residue remained behind.

EXAMPLE 3

1.5 grams of nickel-II acetylacetonate, 2 grams of tri-(o-phenylphenyl) - phosphite and 1.5 grams of a 50% benzenic suspension of sodium amide were suspended in 15 grams of benzene. 40 grams of pentadiene-1,3 were then forced in. The mixture was transferred into an autoclave and heated for 10 hours at 130° C. A pressure of about 15 atmospheres adjusted. On working up the reaction products 34 grams of volatile oligomers were obtained containing 24.5 grams of dimethyl-cyclooctadiene-1,5.

EXAMPLE 4

0.3 grams of nickel acetylacetonate, 0.4 gram of tri-(o-methylphenyl) - phosphite and 0.4 gram of a 50% benzenic suspension of sodium amide were suspended in 23 grams of benzene and the suspension was transferred into an autoclave. 96 grams of butadiene were forced in and the autoclave was heated for 3 hours at about 140° C. A pressure of about 17 atmospheres adjusted. On working up by distillation 73.9 grams of volatile butadiene oligomers were obtained. Besides the catalyst 2.1 grams of higher butadiene oligomers remained behind. The volatile butadiene oligomers contained 9.0 grams of 4-vinylcyclohexene-1, 60.9 grams of cis-cis-cyclooctadiene-1,5 and 2.8 grams of cyclododecatriene.

What is claimed is:

1. In the process for the cyclodimerization of 1,3-diolefins at a temperature in the range of from 0 to 200° C. in the presence of a catalyst system comprising a nickel compound and a phosphorus compound, the improvement of using as catalyst system a system obtained by heating for a short period of time at a temperature in the range of from 100 to 400° C. in the presence of the 1,3-diolefin to be dimerized a mixture of:

(a) 1 mole of at least one nickel compound selected from the group consisting of nickel-II chloride, nickel-II bromide, nickel-II iodide, nickel-II sulfate, nickel-II nitrate, nickel-II formate, nickel-II acetate, nickel-I propionate, nickel-II butyrate, nickel acetylacetonate, nickel diacetyldioxime, nickel-bis-benzyldioxime and nickel oxinate, (b) 0.5 to 10 moles of at least one phosphorus compound selected from the group consisting of

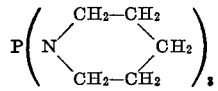

PR$_3$ and P(OR)$_3$ in which R stands for methyl, ethyl, n-propyl, n-butyl and the isomers thereof, cyclohexyl, phenyl, o-phenyl-phenyl, o-methoxyphenyl, o-tolyl, p-tolyl and α-naphthyl, and (c) 0.5 to 10 moles of at least one metal amide selected from the group consisting of lithium amide, sodium amide, potassium amide, calcium amide and magnesium amide.

2. In the process for the cyclodimerization of 1,3-diolefins at a temperature in the range of from 0 to 200° C. at elevated pressure in the presence of a catalyst system comprising a nickel compound and a phosphorus compound, the improvement of using as catalyst system a system obtained by heating for a short period of time at a temperature in the range of from 100 to 400° C. in the presence of the 1,3-diolefin to be dimerized a mixture of:

(a) 1 mole of at least one nickel compound selected from the group consisting of nickel-II chloride, nickel-II bromide, nickel-II iodide, nickel-II sulfate, nickel-II nitrate, nickel-II formate, nickel-II acetate, nickel-II propionate, nickel-II butyrate, nickel acetylacetonate, nickel diacetyldioxime, nickel-bis-benzyldioxime and nickel oxinate, (b) 0.5 to 10 moles of at least one phosphorus compound selected from the group consisting of

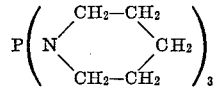

PR$_3$ and P(OR)$_3$ in which R stands for methyl, ethyl, n-propyl, n-butyl and the isomers thereof, cyclohexyl, phenyl, o-phenyl-phenyl, o-methoxyphenyl, o-tolyl and α-naphthyl, and (c) 0.5 to 10 moles of at least one metal amide selected from the group consisting of lithium amide, sodium amide, potassium amide, calcium amide and magnesium amide.

3. The process of claim 1, wherein the nickel compound (a) and the phosphorus compound (b) is a compound selected from the group consisting of NiCl$_2$.2P(C$_6$H$_5$)$_3$ NiBr$_2$.2P(C$_6$H$_5$)$_3$ NiI$_2$.2P(C$_6$H$_5$)$_3$ Ni(NO$_3$)$_2$.2P(C$_6$H$_5$)$_3$ NiCl$_2$.2P(C$_2$H$_5$)(C$_6$H$_5$)$_2$ NiBr$_2$.2P(C$_2$H$_5$)(C$_6$H$_5$)$_2$ NiI$_2$.2P(C$_2$H$_5$)(C$_6$H$_5$)$_2$ Ni(NO$_3$)$_2$.2P(C$_2$H$_5$)(C$_6$H$_5$)$_2$ 4. The process of claim 1, wherein the catalyst system is used in such an amount that the reaction mixture contains 0.1 to 10 millimoles of nickel compound for 100 grams of 1,3-diolefin.

5. The process of claim 1, wherein the diolefin is butadiene-1,3.

6. The process of claim 1, wherein the diolefin is pentadiene-1,3.

7. The process of claim 1, wherein the phosphorus compound is selected from the group of tri-(o-phenylphenyl)-phosphite, tri-(o-methoxyphenyl)-phosphite and tri-(o-tolyl)-phosphite.

8. The process of claim 2, wherein the nickel compound (a) and the phosphorus compound (b) is a compound selected from the group consisting of NiCl$_2$.2P(C$_6$H$_5$)$_3$ NiBr$_2$.2P(C$_6$H$_5$)$_3$ NiI$_2$.2P(C$_6$H$_5$)$_3$ Ni(NO$_3$)$_2$.2P(C$_6$H$_5$)$_3$ NiCl$_2$.2P(C$_2$H$_5$)(C$_6$H$_5$)$_2$ NiBr$_2$.2P(C$_2$H$_5$)(C$_6$H$_5$)$_2$ NiI$_2$.2P(C$_2$H$_5$)(C$_6$H$_5$)$_2$ Ni(NO$_3$)$_2$.2P(C$_2$H$_5$)(C$_6$H$_5$)$_2$ 9. The process of claim 2, wherein the catalyst system is used in such an amount that the reaction mixture contains 0.1 to 10 millimoles of nickel compound for 100 grams of 1,3-diolefin.

10. The process of claim 2, wherein the diolefin is butadiene-1,3.

11. The process of claim 2, wherein the diolefin is pentadiene-1,3.

12. The process of claim 2, wherein the phosphorus compound is selected from the group of tri-(o-phenylphenyl)-phosphite, tri - (o-methoxymethoxy)-phosphite and tri-(o-tolyl)-phosphite.

References Cited

UNITED STATES PATENTS

| | | | |
|---|---|---|---|
| 3,167,593 | 1/1965 | Mueller | 260—666 |
| 3,219,714 | 11/1965 | Kutepow et al. | 260—666 |
| 3,346,608 | 10/1967 | Kutepow et al. | 260—666 |
| 3,352,931 | 11/1967 | Zuech | 260—666 |
| 3,390,195 | 6/1968 | Chappell et al. | 260—666 |
| 3,392,203 | 7/1968 | Olechowski et al. | 260—666 |
| 3,420,904 | 1/1969 | Hellwig | 260—666 |

PAUL M. COUGHLAN, Jr., Primary Examiner

V. O'KEEFE, Assistant Examiner

U.S. Cl. X.R.

252—429